Unites States Patent Office 2,865,212
Patented Dec. 23, 1958

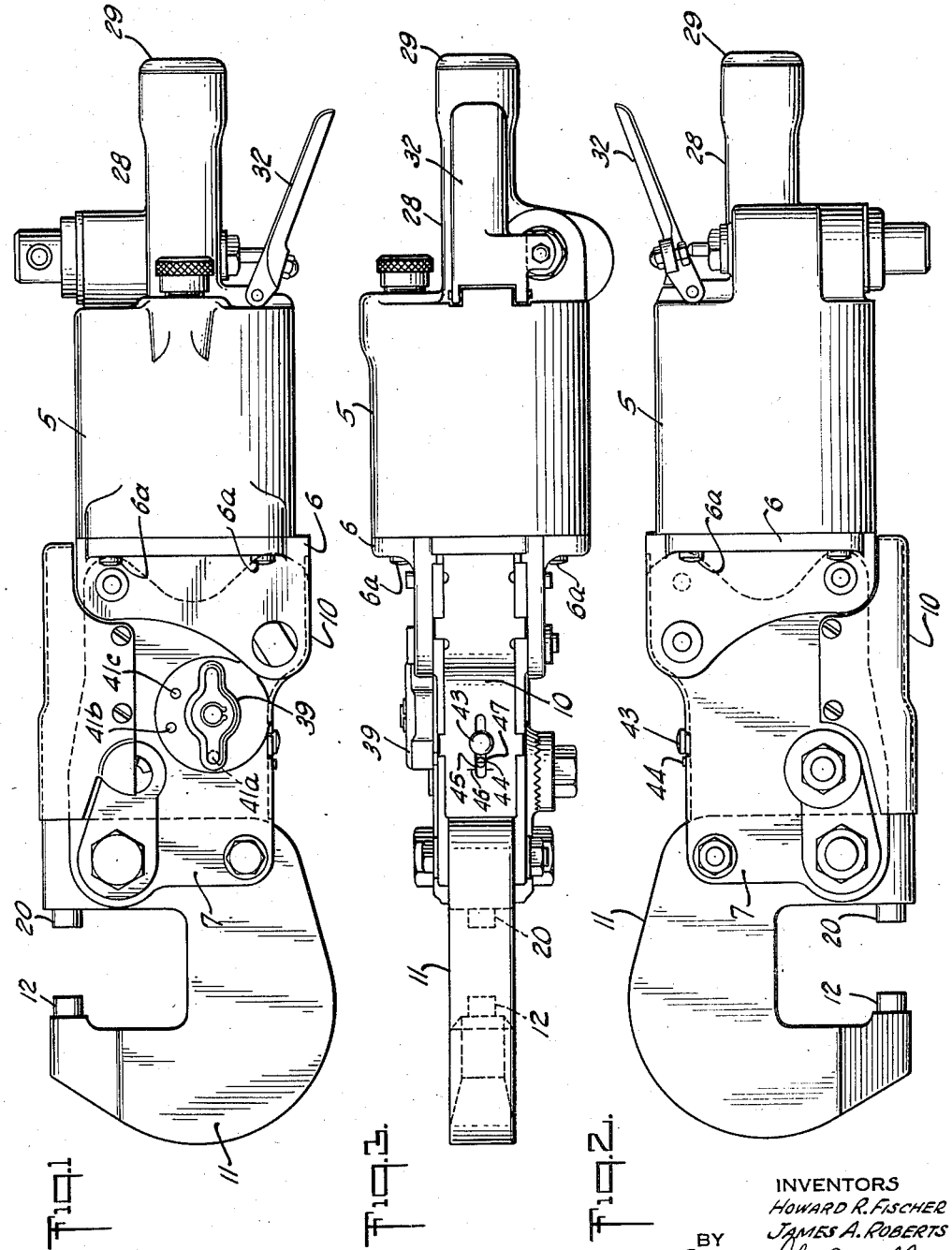

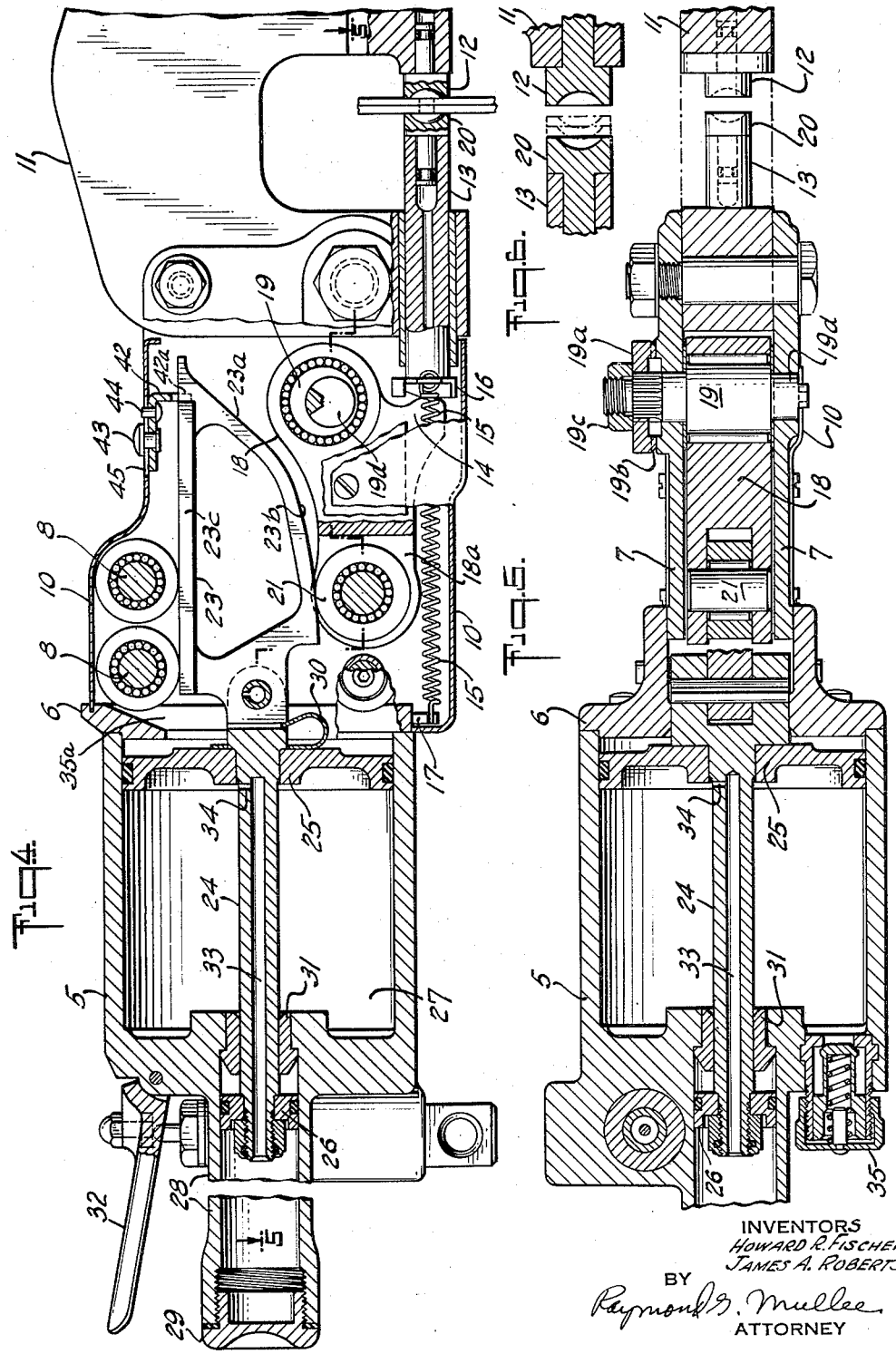

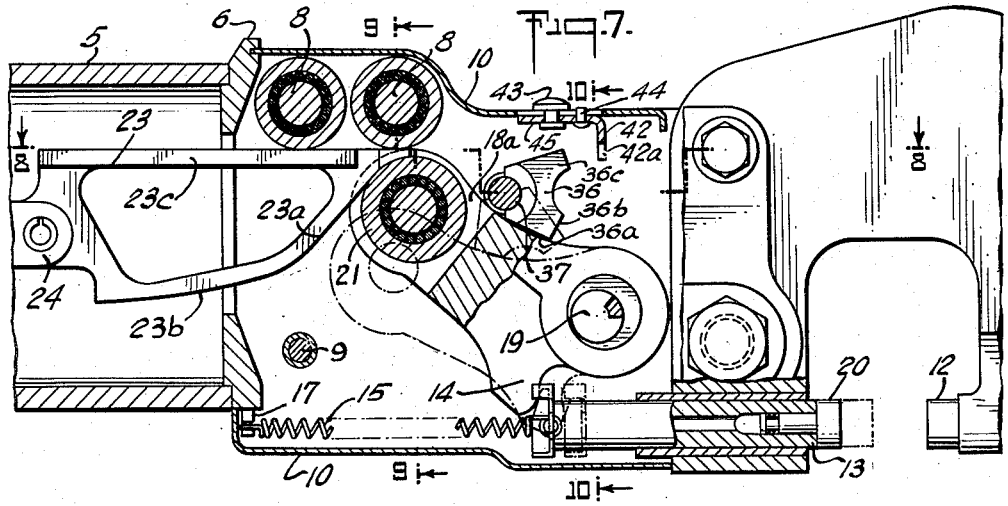

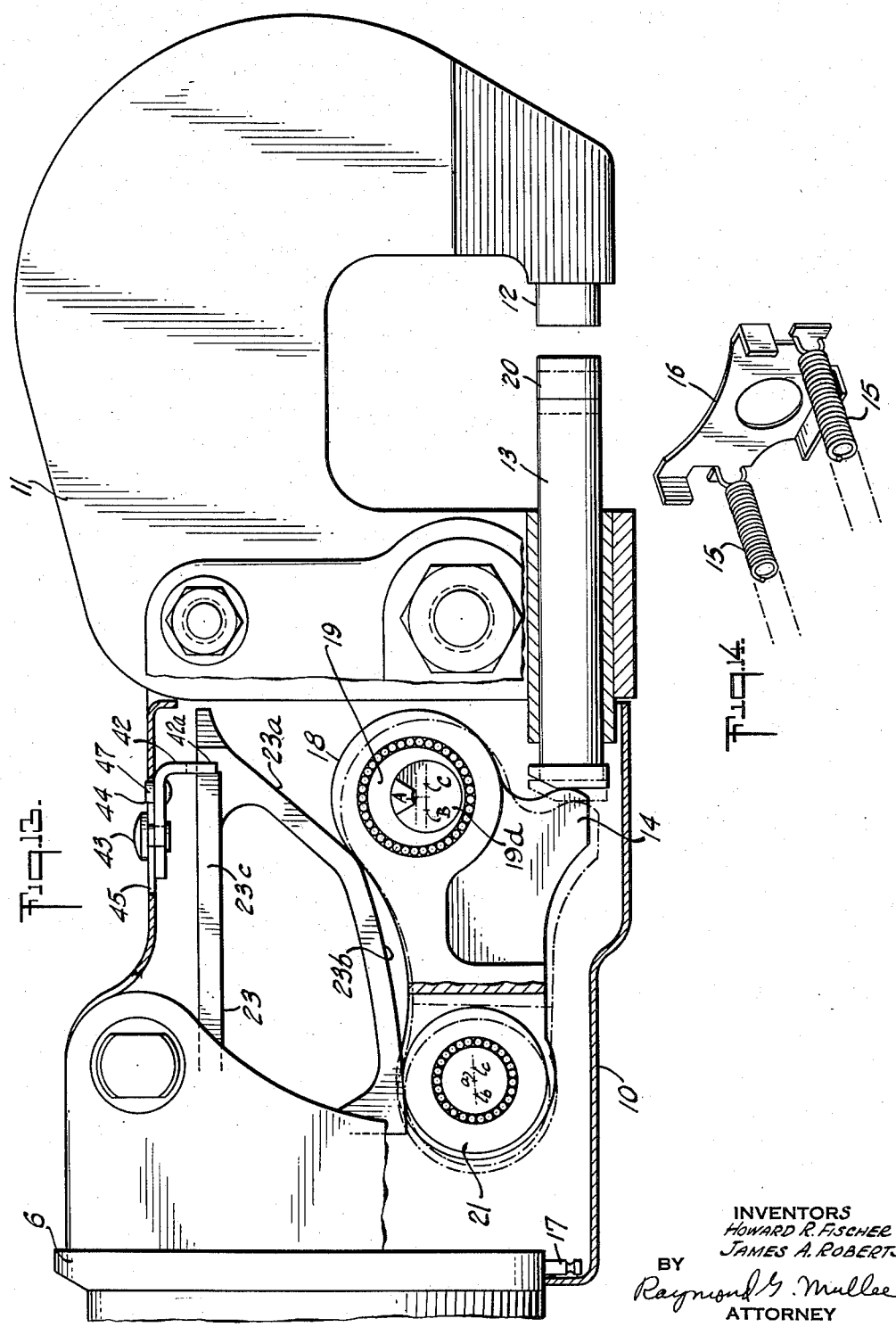

2,865,212

MECHANICAL MOVEMENT FOR PRESSING TOOL

Howard R. Fischer and James A. Roberts, Utica, N. Y., assignors to Chicago Pneumatic Tool Company, New York, N. Y., a corporation of New Jersey Application February 1, 1955, Serial No. 485,546

18 Claims. (Cl. 74—110)

This invention relates to power operated presses, and more particularly to improvements in squeeze riveting machines.

The present invention concerns certain improvements applicable to riveting machines, particularly of the type set forth in prior U. S. Patents 2,310,625 dated February 9, 1943, and 2,467,020 dated April 12, 1949. Briefly, these improvements include a gap adjuster, a grip adjuster and a stroke indicator. In the prior patents supra, the riveting machines disclosed therein include a wedge which transmits power from a piston to a bell crank lever, which is arranged to operate upon a riveting plunger. The wedge has two inclined surfaces of differing slope, one surface being rather steep so that the riveting plunger will be moved fast but with little pressure during the first part of tool operation, and the other surface of more gradual slope, which results in the riveting plunger moving slower but with greater pressure during the latter part of tool operation. In order to obtain greater riveting pressure for the same size tool, the wedge in the device of the present invention has been redesigned so that the gradual slope, or high pressure portion of the wedge, will provide a much higher pressure with shorter travel of the riveting plunger during tool operation. Due to variation in thickness of workpieces, the power stroke for one rivet heading operation may start at a different part of the wedge than for another rivet heading operation. If rivet heading begins too soon (with thick workpiece) the wedge may encounter enough resistance to stall the piston, while the wedge is still operating on the steep part, resulting in insufficient rivet heading pressure. If the resistance develops too late (with thin workpiece), the piston will move the wedge a maximum amount without development of desired high riveting pressure. Prior attempts were made to solve the problem by inserting shims between the rivet set and plunger, or between the plunger and actuating means. This method of adjustment is unsatisfactory, for among other things, it is too time consuming. We have solved the problem in a simple and effective manner, by providing for the adjustment of the position of the fulcrum of the bell crank lever relative to the wedge; this adjustment is made quickly by turning an eccentric shaft, on which the bell crank wedge is mounted. Further details and features of this arrangement are set forth in the disclosure herein.

The main object of the invention is to increase riveting pressure for the same size tool and at the same time overcome certain problems created by this objective due to the fact that the rivet set, in order to obtain the increased pressure, must have a shorter movement on the power stroke.

Another object of the invention is to provide a riveting machine with a gap adjuster which limits the return stroke of the rivet set, thus allowing the machine operator to line up the riveting dies with a rivet more readily in moving from one rivet to the next.

Another object of the invention is to provide a riveting machine with a grip adjuster which allows the machine operator to obtain a correctly driven head in a rapid manner, and without the use of adjusting shims.

Another object of the invention is to provide a riveting machine with a stroke indicator which provides the machine operator with a convenient means of knowing the extent of piston stroke, so that the degree of rivet squeezing can be better ascertained.

These and further objects and features of the invention will be apparent from the following description when read in connection with the accompanying drawings, wherein:

Fig. 1 is a right side view of a squeeze type compression riveting machine embodying features of the invention;

Fig. 2 is a left side view of the machine of Fig. 1;

Fig. 3 is a top or plan view of the machine of Fig. 2;

Fig. 4 is an enlarged partly broken right side view of the machine of Fig. 1, showing certain parts of the machine in longitudinal section;

Fig. 5 is a horizontal longitudinal section of the machine of Fig. 1, as seen from the irregular line 5—5 in Fig. 4;

Fig. 6 is a longitudinal sectional view, slightly enlarged, of rivet sets used in the machine of Fig. 1;

Fig. 7 is a vertical longitudinal sectional view of the forward part of the machine, similar to Fig. 4, but illustrating certain parts of the machine in different operative position;

Fig. 8 is a horizontal longitudinal section as seen from line 8—8 in Fig. 7;

Fig. 9 is a cross-sectional view as seen from line 9—9 in Fig. 7;

Fig. 10 is a cross-sectional view as seen from line 10—10 in Fig. 7;

Fig. 11 is a front view of the stroke indicator slide;

Fig. 12 is a front view of the driving wedge;

Fig. 13 is an enlarged view similar to Fig. 7 showing the bell crank lever in operative position, and including broken lines showing the position of the bell crank lever and rivet set plunger corresponding to a different setting of the grip adjusting means; and Fig. 14 is a perspective view of a rivet plunger return yoke.

The machine disclosed herein as embodying the mechanism of the present invention is a portable compression riveter which is light in weight and is adapted to be held or supported in the hands of the operator, when in use. Referring to the drawings, it will be seen that the principal supporting elements of the machine are a cylinder 5, an adapter 6, associated with the cylinder, and a pair of yoke frames 7. A pair of guard plates 10 enclose the top and bottom open sides of the yoke frames 7. The adapter 6 fits into the front end of the cylinder 5 and is held in place by screws 6a, which extend into the wall of the cylinder. The adapter extends a short distance beyond the end of the cylinder 5 and is secured to the end of the yoke frames 7 by a pair of shafts 8 and a pin 9. At the forward ends of the yoke frames 7 is detachably secured a yoke 11. A particular yoke 11 is shown here merely by way of illustration since any one of a plurality of differently formed yokes may be attached to the yoke frames 7; the selection of a particular yoke being determined by the requirements of the work to be done. Each yoke, however, is formed with an anvil head in which is positioned a stationary die or dolly 12 in line with a rivet set 20 carried by a plunger 13 which is movably supported in the lower portion of the yoke 11. The dolly 12 and rivet set 20 cooperate as riveting dies between which work sheets of varying thickness may be placed and joined by a rivet headed by the pressure of said plunger. The rivet set plunger 13 is urged rearward away from the die 12 by a pair of springs 15 each spring being tensioned between a spring yoke 16 affixed to the end of the riveting plunger, and a pin 17 attached to the adapter 6. The spring end of the plunger 13 contacts a nose or shoulder 14 formed on the short arm of a lever 18 of the bell crank type. Lever 18 is pivotally mounted by means of roller bearings upon an eccentric shaft 19 which is supported between the yoke frames 7. The free end of the long arm of lever 18 is bifurcated to form a pair of sides 18a which support a roller 21. The roller 21 is normally spaced slightly from one of a pair of rollers 22 mounted on the shafts 8, and a wedge 23 is arranged to enter between the rollers 21 and 22 and thereby force the lever 18 in a counterclockwise direction (Fig. 4) to press the rivet set plunger 13 toward the die 12. To reduce friction, roller bearings are provided for the rollers 21 and 22. The wedge 23 is pivotally connected to the bifurcated end of a piston rod 24 which forms part of a piston assembly movable within the cylinder 5. A spring 30 is arranged to urge the wedge 23 rotatively against the rollers 22. The main body of shaft 19, which is concentric with the roller bearing on which bell crank lever 18 is pivoted, has a pair of reduced diameter extensions 19d mounted for turning movement in a pair of bores 7a in the yoke frames 7. The extensions 19d and bores 7a are of the same diameter and have a common center which however is eccentric with respect to the main body of the shaft 19. As a result, the shaft on being rotated, is adapted to shift the pivotal axis of the bell crank lever 18 from the point A (Fig. 13) in an arc either forwardly toward the point C or rearwardly toward the point B. This results in the power stroke of the riveting plunger being adjustable for commencement at a relatively early stage of movement of the piston wedge assembly, or at a more advanced stage. As a result the power stroke of the rivet set does not begin until roller 21 has entered the 23b part of the wedge curve, and that the power stroke is completed before the piston reaches the end of the cylinder. Eccentric shaft 19 is splined to a grip adjustment knob 19a which has teeth 19b on the side thereof engaging with similar teeth formed on the outside of a yoke frame 7. Upon releasing the knob 19a by way of nut 19c, the eccentric shaft 19 may be rotated, and set in any adjusted position.

The piston assembly comprises, in addition to the rod 24 (Fig. 4), a pair of pistons 25 and 26 secured to the rod 24 and movable through respective chambers 27 and 28 formed in the cylinder 5. The chamber 28 is of considerably less diameter than the chamber 27 and is formed in a reduced elongated portion of the cylinder, which portion may be used as a handle for the tool. The outer end of the chamber 28 is closed by a cap 29, and a piston rod bushing 31 positioned in the inner end of chamber 28 acts as a seal between the chambers 27 and 28. To effect reciprocation of the piston assembly through power and return strokes, pressure fluid is supplied to the tool from a remote source and may be alternately admitted to and vented from the chamber 27 in back of piston 25. In the former instance the assembly is driven forward (see Fig. 4) to force the wedge between the rollers 21 and 22 and set the rivet, while in the latter instance the assembly is returned to the starting position (Fig. 7). Any suitable means may be provided for controlling the flow of pressure fluid, for example, a conventional four-way valve. According to another and preferred method, as is more clearly shown and described in my prior Patent 2,310,625, valve means operating under the control of a hand lever 32 acts to admit pressure fluid selectively to the back of piston 25 and constantly to the front of piston 26. The operator holds the valve open to move the piston forwardly until stalled by resistance of the work. In order to assure the same piston pressure on each operation, a spring loaded relief valve 35 is provided to limit the air pressure in the cylinder 5. Alternatively, a pressure regulator in the feed line, may be used. The piston is returned to starting position when the operator manually releases the valve upon noting that the piston has stopped, i. e. stalled. In order that the continuously applied return pressure may be balanced during the power stroke, pressure fluid is directed to the rear of piston 26 by means of a passage 33 in the rod 24, this passage receiving fluid through a port 34 communicating with the area in back of piston 25.

A gap adjuster arrangement comprises a cam 36 which is affixed to a shaft 37 supported in a projecting portion 38 of a knob 39, the projecting portion 38 being arranged for rotary movement within the yoke frame 7, as best seen in Fig. 8. Within the knob 39 is a spring loaded detent pin 41, a pointed end of which is arranged to seat in any one of three detent holes 41a, b, c (Fig. 1) formed on the outer side of the yoke frame 7. The cam 36 has three surfaces 36a, 36b and 36c each at a different radial distance from the axis of shaft 37, and which when engaged with a top portion of a lever arm 18a, will limit the clockwise rotation of the lever 18 to three positions of adjustment. The holes 41a, b, c are located to correspond with the holding position of cam 36, so that the latter may be maintained in its position of adjustment. The cam surfaces 36b and 36c, when engaging the lever arm 18a, result in maintaining the lever shoulder 14 in closer relation to the yoke 11, so that the rivet set plunger 13 is held closer to the die 12, thus allowing the tool operator to better line up the rivet set 20 with the rivet to get a correctly driven head upon squeezing thereof. It will be seen that when cams 36b and 36c are being used, the piston moves back all the way with the roller 21 losing contact with the wedge until the piston has started moving forward on the next power stroke.

The wedge 23 projects through an opening 35a formed in the adapter 6 and the end thereof normally engages the roller 21. The face of the wedge adjacent the roller 21 is formed with a cam surface made up of two inclined surfaces 23a and 23b adapted to be placed successively in cooperative relation with the roller 21. During outward motion of the wedge 23 on the power stroke, the roller 21 travels first on inclined portion 23a, which, having a steep slope, will result in movement of the rivet set plunger 13 fast, but without a relatively high working pressure. As the wedge advances, the lever 18 is rotated counterclockwise about the eccentric shaft 19 away from the position shown in Fig. 7, thereby increasing the effective length of the power arm of the lever which is represented by the distance between the eccentric shaft 19 and the line of applied force which passes through the center of the roller 21. The slope of the cam surface on the wedge becomes more gradual as the roller 21 enters upon portion 23b, causing the plunger 13 to be moved slower and with greater pressure resulting in increased mechanical advantage. With the elements in the Fig. 4 position, the effective length of the power arm of the lever 18 approaches maximum and changes only in a relatively slight degree in relation to further counterclockwise movement. As long as the roller 21 remains on the portion 23b, there is no substantial further change in mechanical advantage because the surface 23b is uniform in slope and engages the roller 21 to move the lever 18 to a position in which its effective length approaches a maximum amount with a minimum rate of change. The stroke of the wedge permits the roller to travel a short or long distance on portion 23b according to the thickness of the work sheets. However, whether the sheets permit a travel of the roller to only partial or maximum amount on the surface 23b, the slope, mechanical advantage and final rivet heading pressure will be substantially the same.

The stroke indicator of the invention comprises a stroke indicator L-shaped slide 42, which is supported by a button 43 for sliding movement on the underside of the guard plate 10. A locater rivet 44 is affixed to the slide 42, said rivet 44 being arranged to ride in a slot 45 formed in the guard plate (Fig. 3). The downwardly extending portion of the slide 42 is arranged to be engaged by the end of the wings 23c formed on the wedge 23 as it moves away from the cylinder 5 on a power stroke. No contact is made with the slide 42 until the piston has moved through the preliminary or locating portion of its stroke and the roller 21 rolls over the steep portion 23a of the wedge. About the time the roller enters upon the power portion 23b of the wedge, the wings 23c abut fingers 42a of the slide 42, and move the latter forwardly; the slide remains at the point of maximum wedge travel, when the piston reverses its movement. On the top side of the guard plate 10, and running perpendicular to the slot 45, is a mark 46, which indicates the foremost point which the slide reaches on a power stroke. A mark 47 is likewise formed on the top of the indicator rivet 44. When setting the tool for rivet heading operations, the tool operator observes where the mark 47 stops after a rivet is set; if the operator notices that the slide 42 has not moved forward, he may conclude that the piston stalled after moving an insufficient distance with the roller 21 still on the steep portion 23a of the wedge, whereby the piston pressure, even though developed to its full predetermined amount, was not multiplied at the correct ratio to give full pressure on the rivet being set. To correct the condition, he turns the shaft 19 so that the eccentric arrangement thereof moves the bell crank lever axis rearward toward the "B" position (Fig. 13). As a result, the roller 21 is able to reach the 23b portion of the wedge, and thereby develop desired rivet set pressure. If the slide has moved all the way forward, it means the piston was stalled, not necessarily by the attainment of a predetermined resistance of the work, but (more likely) by the piston striking the adapter or cylinder head. To correct the condition, the operator turns the shaft 19 so that the eccentric arrangement thereof moves the bell crank forward toward the "C" position. As a result, the roller 21 is able to develop desired rivet set pressure before it has travelled the full length of portion 23b of the wedge. By the use of this invention, the final pressure on each set rivet will not vary from stroke to stroke, as long as the operator adjusts the eccentric shaft to terminate the stroke with the roller upon the constant force ratio (23b) part of the wedge, and also controls the air pressure in the cylinder by means of valve 35, or otherwise, to obtain the same cylinder pressure each time the piston stalls. By means of the stroke indicator, used in conjunction with the eccentric shaft 19 and adjustment thereof, the tool operator may attain proper riveting adjustment in a convenient, positive and rapid manner.

While the invention has been described with reference to a C-type yoke having a rivet set plunger movable in a line parallel to the piston, the invention is applicable to riveters in which the plunger is arranged to move transversely with respect to the piston, and also to yokes of the alligator type.

What is claimed is:

1. In a power operated machine of the character described, a mechanical movement comprising a piston powered by a constant pressure having a cam end defined by an upper steep slope merging into a lower relatively gradual slope, a power plunger, a housing for the piston and plunger, a shaft positioned in the housing, a bell crank lever pivotally mounted at one end on the shaft to transmit movement from the piston cam end to the plunger, a roller carried by the free end of the lever, and a shoulder formed on the lever at its pivoted end abutting an end of the plunger, said steep slope coacting upon a power stroke of the piston with the roller to move the lever rapidly about its pivot and thereby cause a rapid initial movement of the plunger, and the lower slope coacting after the latter action with the roller to effect a relatively slower subsequent movement of the plunger; characterized by means for adjusting the position of the shaft relative to the housing and thereby adjusting the location of the roller relative to the cam end of the piston for any given position of the piston so as to cause the roller to ride upon the lower slope immediately subsequent to movement of the piston for a predetermined distance.

2. A mechanical movement as defined in claim 1, characterized by indicia on the housing and by means operable by the piston upon the upper slope of the cam end passing beyond a predetermined point to indicate relative to the indicia the foremost position attainable by the lower slope of the cam end on a power stroke.

3. In the combination comprising an elongated slidable tool adapted when driven in a forward direction to abut one end thereof against a workpiece, a spring load urging the tool away from the workpiece, a housing supporting the tool, a shaft supported in the housing cross-wise to the direction of movement of the tool, a lever pivoted at one end upon the shaft and having a toe portion in its pivoted area abutting the other end of the tool, the lever being pivotable upon application of a force in a particular direction to its free end to slide the tool against the spring load into abutment with the workpiece, and the spring load adapted upon relaxing of the applied force to act through the tool to pivot the lever in a return direction, means supported in the housing adjustable to limit the extent of pivoting of the lever in a return direction to a selected one of a plurality of positions, whereby the moved position of the tool under the spring load away from the workpiece is selectively predetermined.

4. In a combination including a power driven piston adapted to stall on a power stroke upon meeting a predetermined resistance, a slidable tool, and separate power transmitting means adjustably arranged between the piston and the tool for transmitting movement of the piston on a power stroke to the tool, wherein the normal efficient distance of travel of the piston on a power stroke is dependent upon a proper adjusted relation of the power transmitting means to the piston; a housing containing the foregoing elements and having a slot extending in parallel relation to the direction of movement of the piston, a slide in the slot having a depending portion abuttable by the piston on a power stroke so as to carry the slide from a normal rear position in the slot forwardly until the termination of the power stroke of the piston, a fixed mark in the outer surface of the housing bordering the slot, and a complementary mark on the slide readable relative to the fixed mark, whereby the extent of movement of the piston on a particular power stroke is determinable.

5. In a power operated mechanism according to claim 1, wherein the shaft has a cylindrical body portion having cylindrical extensions pivoted to the housing, the extensions being eccentric to the body portion and the shaft being capable of rotation about the axis of the extensions to provide the adjusting means aforesaid.

6. In a power operated machine, a mechanical movement comprising a piston having a camming surface thereon of varying slope, a power plunger, a housing for the piston and plunger, a shaft positioned in the housing, a bell crank lever pivotally mounted on the shaft to transmit movement from the piston cam to the plunger, a roller carried by a free end of the power arm of the lever, said camming surface coacting with said roller to move the lever about its pivot, and the lever having a shoulder formed thereon to actuate the plunger, characterized by means for adjusting the position of the shaft relative to the housing thereby adjusting the location of the roller relative to the camming surface for any given position of the piston, wherein the shaft has a cylindrical body portion having cylindrical extensions pivoted to the housing, the extensions being eccentric to the body portion, the shaft being capable of rotation about the axis of the extensions to provide the adjusting means aforesaid, and wherein said adjustment means includes a knob arranged on the end of the shaft and having a toothed portion for engagement with a toothed portion formed on the exterior of the housing, and a holding means to hold the knob toothed portion in engagement with the housing toothed portion.

7. In a power operated machine according to claim 6, wherein the holding means is a nut which is threadably affixed to the end of the shaft.

8. In a power operated machine according to claim 1, a stroke indicator operable by the piston cam and which is arranged to indicate the extent of forward movement beyond a predetermined point of the lower slope of the piston cam on a power stroke.

9. In a power operated machine, a mechanical movement comprising a piston having a camming surface thereon of varying slope, a power plunger, a housing for the piston and plunger, a shaft positioned in the housing, a bell crank lever pivotally mounted on the shaft to transmit movement from the piston cam to the plunger, a roller carried by a free end of the power arm of the lever, said camming surface coacting with said roller to move the lever about its pivot, and said lever having a shoulder formed thereon to actuate the plunger, characterized by means for adjusting the position of the shaft relative to the housing thereby adjusting the location of the roller relative to the camming surface for any given position of the piston, and a stroke indicator which is arranged to indicate the extent of forward movement of the piston cam on a power stroke wherein the stroke indicator comprises an L-shaped slide which is arranged on the inner side of the housing so that one end thereof extends into the path of movement of the piston cam.

10. In a power operated machine according to claim 9, wherein the stroke indicator has a button affixed thereto, which projects outwardly of the housing so that the stroke indicator may be set prior to a power stroke of the piston cam.

11. In a power operated machine, a mechanical movement comprising a piston having a camming surface thereon of varying slope, a power plunger, a housing for the piston and plunger, a shaft positioned in the housing, a bell crank lever pivotally mounted on the shaft to transmit movement from the piston cam to the plunger, a roller carried by a free end of the power arm of the lever, said camming surface coacting with said roller to move the lever about its pivot, and said lever having a shoulder formed thereon to actuate the plunger, characterized by means for adjusting the position of the shaft relative to the housing thereby adjusting the location of the roller relative to the camming surface for any given position of the piston, a gap adjuster including a plurality of cam surfaces which are arranged to restrict rotary motion of the bell crank lever in one direction of rotation, whereby the plunger is maintained selectively at different distances relative to the piston when the latter is in non-operative position.

12. In a power operated machine according to claim 5, wherein the gap adjuster includes a knob arranged on the exterior of the housing, which knob can be rotated to a plurality of holding positions so that any one of the gap adjuster cam surfaces can be selectively set for engagement with the bell crank lever.

13. In a power operated machine, a mechanical movement comprising a piston having a camming surface thereon of varying slope, a power plunger, a housing for the piston and plunger, a shaft positioned in the housing, a bell crank lever pivotally mounted on the shaft to transmit movement from the piston cam to the plunger, a roller carried by a free end of the power arm of the lever, said camming surface coacting with said roller to move the lever about its pivot, and said lever having a shoulder integrally formed thereon to actuate the plunger, characterized by stroke indicating means to indicate the foremost position attained by the piston cam on a power stroke, wherein the stroke indicating means comprises an L-shaped slide which is arranged on the inner side of the housing so that one end thereof extends into the path of movement of the piston cam.

14. In a power operated machine, a mechanical movement comprising a piston having a camming surface thereon of varying slope, a power plunger, a housing for the piston and plunger, a shaft positioned in the housing, a bell crank lever pivotally mounted on the shaft to transmit movement from the piston cam to the plunger, a roller carried by a free end of the power arm of the lever, said camming surface coacting with said roller to move the lever about its pivot, and said lever having a shoulder integrally formed thereon to actuate the plunger, characterized by a gap adjuster including a plurality of cam surfaces which are arranged to restrict rotary motion of the bell crank lever in one direction of rotation, whereby the plunger is maintained selectively at different distances relative to the piston when the latter is in non-operative position.

15. In a power operated machine according to claim 14, wherein the gap adjuster includes a knob arranged on the exterior of the housing, which knob can be rotated to a plurality of holding positions so that any one of the gap adjuster cam surfaces can be selectively set for engagement with the bell crank lever.

16. In a power operated machine, a mechanical movement comprising a driving piston, a wedge carried by the piston and having a cam defined by a steep upper slope merging abruptly into a relatively gradual lower slope thereon of varying slope, a driven element, a housing for the piston and wedge, a shaft supported by the housing, a lever pivotally mounted on the shaft to transmit movement from the wedge to the driven element to engage the latter with a work piece, a roller carried by a free end of the power arm of the lever, said steep slope coacting with said roller to move the lever rapidly about its pivot and to effect rapid engagement of the driven element with the work piece, means for adjusting the position of the shaft relative to the housing, thereby adjusting the location of the roller relative to the cam for any given position of the piston so as to cause the roller to ride upon the lower slope immediately subsequent to engagement of the driven element with the work piece, and means for locking the shaft in adjusted position.

17. In a tool of the character described a slidable working element, a power actuated slidable wedge, characterized by a steep sloping portion merging into a relatively gradual sloping portion, a pivoted lever engaged by said wedge and responsive during engagement with the steep slope of the wedge to impart a rapid sliding movement of the working element for a predetermined distance, and responsive upon engagement with the gradual sloping portion to impart a working stroke of the working element at a lesser rate of speed than that of said wedge, and means for relatively adjusting the pivot position of the lever so as to adjust the engaging portion of the lever relative to the slidable wedge to effect the working stroke of the working element when the lever engages the gradual sloping cam portion.

18. In a tool as defined in claim 17, wherein indicator means is provided operable by the wedge relative to markings on the housing to indicate whether the engaging position of the lever relative to the wedge is proper.

References Cited in the file of this patent

UNITED STATES PATENTS

| | | |
|---|---|---|
| 1,741,677 | Brewer | Dec. 31, 1929 |
| 2,467,020 | Fisher | Apr. 12, 1949 |